United States Patent
Yang et al.

(10) Patent No.: US 12,153,557 B2
(45) Date of Patent: Nov. 26, 2024

(54) DATA PROCESSING METHOD AND APPARATUS BASED ON MERKLE TREE

(71) Applicant: Beijing Volcano Engine Technology Co., Ltd., Beijing (CN)

(72) Inventors: Xinying Yang, Beijing (CN); Qun Gao, Beijing (CN); Hao Yang, Beijing (CN)

(73) Assignee: Beijing Volcano Engine Technology Co., Ltd., Beijing (CN)

( * ) Notice: Subject to any disclaimer, the term of this patent is extended or adjusted under 35 U.S.C. 154(b) by 0 days.

(21) Appl. No.: 18/518,347

(22) Filed: Nov. 22, 2023

(65) Prior Publication Data
US 2024/0184759 A1 Jun. 6, 2024

(30) Foreign Application Priority Data
Dec. 6, 2022 (CN) .......................... 202211560655.5

(51) Int. Cl.
 *G06F 16/22* (2019.01)
(52) U.S. Cl.
 CPC ................. *G06F 16/2246* (2019.01)
(58) Field of Classification Search
 None
 See application file for complete search history.

(56) References Cited

U.S. PATENT DOCUMENTS

2020/0167345 A1 * 5/2020 Zhuo .................... G06Q 20/388
2020/0322159 A1   10/2020 Xu et al.

FOREIGN PATENT DOCUMENTS

GB          2615598 A  *  8/2023  ........... H04L 9/3236

OTHER PUBLICATIONS

European Patent Application No. 23210870.4; Extended Search Report; dated Mar. 26, 2024; 9 pages.
Zhang et al.; "GEM2-Tree: A Gas-Efficient Structure for Authenticated Range Queries in Blockchain"; IEEE 35th Int'l Conf. on Data Engineering; 2019; p. 842-853.

* cited by examiner

*Primary Examiner* — Irene Baker
(74) *Attorney, Agent, or Firm* — BakerHostetler

(57) ABSTRACT

The present disclosure relates to a data processing method and apparatus based on a Merkel tree, the method optimizes the structure of the Merkel tree so that when generating a Merkel tree to be updated based on the original service data and inserting a new leaf node into the Merkel tree, no parent node is created for a leaf node without a sibling node and a non-leaf node without a sibling node; specially, when there is new service data, a corresponding new leaf node is created and inserted into the leaf node layer; if the new leaf node is located at an odd position in the leaf node layer, the non-leaf node layer does not need to be updated; if the new leaf node is located at an even position in the leaf node layer, a new non-leaf node is created and inserted into the non-leaf node layer.

20 Claims, 5 Drawing Sheets

DATA PROCESSING METHOD AND APPARATUS BASED ON MERKLE TREE

CROSS-REFERENCE TO RELATED APPLICATION

The present disclosure claims priority of the Chinese Patent Application No. 202211560655.5, filed on Dec. 6, 2022, the entire disclosure of which is incorporated herein by reference as part of the present disclosure.

TECHNICAL FIELD

The present disclosure relates to the technical field of data processing, in particular to a data processing method and apparatus based on a Merkle tree.

BACKGROUND

A Merkle tree, also known as a hash tree, is a typical binary tree structure consisting of a set of leaf nodes, a set of intermediate nodes, and a root node. The leaf nodes carry hash values of data, the intermediate nodes are hash values of their two child nodes, and the root node at the top layer is also composed of hash values of its two child nodes. Changes in the underlying data of the Merkle tree propagate to its parent nodes until reaching the root node, making the Merkle tree a verifiable data structure. Due to this property, Merkle trees are widely applied in various fields. Tasks such as rapid comparison of large amounts of data, fast locating of modifications, and knowledge proof can be performed by creating and maintaining Merkle trees.

Currently, when new service data is added, the Merkle tree needs to be updated by inserting a new leaf node, and a large number of intermediate nodes on the upper layer and the root node also need to be updated. This computation-intensive process can result in poor overall data processing performance.

SUMMARY

In order to solve the above technical problem, the present disclosure provides a data processing method and apparatus based on a Merkel tree.

In a first aspect, the present disclosure provides a data processing method based on a Merkel tree, which includes:
  acquiring new service data and a Merkle tree to be updated, the Merkle tree to be updated including a leaf node layer and a non-leaf node layer, a leaf node included in the leaf node layer carrying a hash value of original service data, a hash value carried by a non-leaf node included in the non-leaf node layer being obtained by calculating hash values of two child nodes, and in the Merkle tree to be updated, there is no such a node that its adjacent node has no parent node;
  creating a new leaf node corresponding to the new service data, calculating a hash value of the new service data as a hash value of the new leaf node, and inserting the hash value of the new leaf node into an end position of the leaf node layer;
  if the new leaf node is located at an odd position in the leaf node layer, obtaining a target Merkle tree based on an updated leaf node layer and the non-leaf node layer of the Merkle tree to be updated; and
  if the new leaf node is located at an even position in the leaf node layer, creating a new non-leaf node as a parent node for two adjacent child nodes without parent nodes in a bottom-up order, determining a hash value of the new non-leaf node based on hash values carried by the two adjacent child nodes, inserting the new non-leaf node into the non-leaf node layer, and obtaining the target Merkle tree based on the updated leaf node layer and the updated non-leaf node layer, in the target Merkle tree, there is no such a node that its adjacent node has no parent node.

In some embodiments, if the new non-leaf node is a parent node of the new leaf node, two adjacent child nodes of the new non-leaf node include the new leaf node and a corresponding target associated node; if the new non-leaf node is a parent node of two non-leaf nodes, the two adjacent child nodes of the new non-leaf node include a corresponding target associated node and a previously created new non-leaf node; and the target associated node is a node on a verification path corresponding to the new leaf node.

In some embodiments, the method further includes:
  acquiring a position index of a sibling node of the new leaf node in the leaf node layer and converting a corresponding position index of the sibling node into a first bit sequence;
  traversing the first bit sequence in the order from the highest bit to the lowest bit, and if a first target bit satisfying a first predetermined condition is traversed, determining a candidate associated node set based on a non-leaf node or a leaf node indicated by the first target bit that is traversed; and
  determining the target associated node related to the new non-leaf node from the candidate associated node set based on a position of the new leaf node in the leaf node layer.

In some embodiments, determining a candidate associated node set based on a non-leaf node or a leaf node indicated by the first target bit that is traversed includes:
  if the first target bit is not the lowest bit, performing a power operation on a position index of the first target bit in the first bit sequence to obtain a position index difference, adding the position index difference to a position index of a non-leaf node indicated by a previous first target bit to obtain a target position index, and determining that a non-leaf node corresponding to the target position index is a candidate associated node included in the candidate associated node set; and
  if the first target bit is the lowest bit, determining that a sibling node of the new leaf node is the candidate associated node.

In some embodiments, a position index of each bit in the first bit sequence is numbered starting from 0 in the direction from the lowest bit to the highest bit, and the first predetermined condition is that a value of the bit is 1.

In some embodiments, determining the target associated node related to the new non-leaf node from the candidate associated node set based on a position of the new leaf node in the leaf node layer includes:
  acquiring a position index of the new leaf node in the leaf node layer, and converting a corresponding position index of the new leaf node into a second bit sequence;
  traversing the second bit sequence in the order from the lowest bit to the highest bit to determine a second target bit; and
  determining a number of the target associated nodes based on a distance between the second target bit and the lowest bit, and determining a corresponding number of candidate associated nodes from the candidate associated node set in an order from late to early in determining the candidate associated nodes as the target associated nodes.

In some embodiments, the position index of each bit in the second bit sequence is numbered starting from 0 in the direction from the lowest bit to the highest bit, and the second target bit is a bit with a value of 1 in the second bit sequence and closest to the lowest bit.

In some embodiments, the Merkle tree to be updated is stored using a one-dimensional array structure, hash values of each leaf node included in the leaf node layer are stored in a first array in an order of generation, and hash values of each non-leaf node included in the non-leaf node layer are stored in a second array in the order of generation;

inserting the new leaf node into the leaf node layer includes: inserting the hash value of the new leaf node into an end of the first array corresponding to the leaf node layer; and inserting the new non-leaf node into the non-leaf node layer includes: inserting the hash value of the new non-leaf node into an end of the second array corresponding to the non-leaf node layer.

In a second aspect, the present disclosure provides a data processing apparatus based on a Merkel tree, which includes:

an acquisition module configured to acquire new service data and a Merkle tree to be updated, the Merkle tree to be updated including a leaf node layer and a non-leaf node layer, a leaf node included in the leaf node layer carrying a hash value of original service data, a hash value carried by a non-leaf node included in the non-leaf node layer being obtained by calculating hash values of two child nodes, and in the Merkle tree to be updated, there is no such a node that its adjacent node has no parent node;

a leaf node layer updating module configured to create a new leaf node corresponding to the new service data, calculate a hash value of the new service data as a hash value of the new leaf node, and insert the hash value of the new leaf node into an end position of the leaf node layer;

an update result integration module configured to, if the new leaf node is located at an odd position in the leaf node layer, obtain a target Merkle tree based on an updated leaf node layer and the non-leaf node layer of the Merkle tree to be updated; and a non-leaf node layer updating module configured to, if the new leaf node is located at an even position in the leaf node layer, create a new non-leaf node as a parent node for two adjacent child nodes without parent nodes in a bottom-up order, determine a hash value of the new non-leaf node based on hash values carried by the two adjacent child nodes, and insert the new non-leaf node into the non-leaf node layer;

the update result integration module is further configured to, if the new leaf node is located at an even position in the leaf node layer, obtain the target Merkle tree based on the updated leaf node layer and the updated non-leaf node layer, and in the target Merkle tree, there is no such a node that its adjacent node has no parent node.

In a third aspect, the present disclosure provides an electronic device, which includes a memory and a processor; the memory is configured to store computer program instructions; and the processor is configured to execute the computer program instructions, causing the electronic device to implement a data processing method based on a Merkle tree as described in the first aspect and in any item of the first aspect.

In a fourth aspect, the present disclosure provides a readable storage medium, which includes computer program instructions; at least one processor of an electronic device executes the computer program instructions, causing the electronic device to implement the data processing method based on the Merkle tree as described in the first aspect and in any item of the first aspect.

In a fifth aspect, the present disclosure provides a computer program product, an electronic device executes the computer program product, causing the electronic device to implement the data processing method based on the Merkle tree as described in the first aspect and in any item of the first aspect.

The present disclosure provides a data processing method and apparatus based on a Merkel tree, the method optimizes the structure of the Merkel tree so that when generating a Merkel tree to be updated based on the original service data and inserting a new leaf node into the Merkel tree, no parent node is created for a leaf node without a sibling node and a non-leaf node without a sibling node; specially, when there is new service data, a corresponding new leaf node is created and inserted into the leaf node layer; if the new leaf node is located at an odd position in the leaf node layer, the non-leaf node layer does not need to be updated; if the new leaf node is located at an even position in the leaf node layer, a new non-leaf node is created and inserted into the non-leaf node layer. Using this method, the number of nodes that need to be calculated when inserting a new leaf node is greatly reduced, and the amount of calculation is also reduced, which solves the problem of a large number of redundant calculations that exists when using the traditional Merkel tree structure, and can greatly improve the efficiency of data processing.

BRIEF DESCRIPTION OF THE DRAWINGS

The drawings herein are incorporated into and form a part of the specification, illustrate embodiments consistent with the present disclosure, and are used in conjunction with the specification to explain the principles of the present disclosure.

To more clearly illustrate the embodiments of the present disclosure, the drawings required to be used for the embodiments are briefly described in the following, obviously, for those skilled in the art, other drawings can be acquired based on these drawings without any inventive work.

DETAILED DESCRIPTION

In order to understand the above objects, features and advantages of the present disclosure more clearly, the solutions of the present disclosure are further described below.

It should be noted that embodiments and features in the embodiments of the present disclosure may be combined with each other without conflict.

Many specific details are set forth in the following description to facilitate a full understanding of the present disclosure, but the present disclosure may also be implemented in other ways different from those described herein; obviously, the embodiments in the specification are only a part but not all of the embodiments of the present disclosure.

Figure 1:
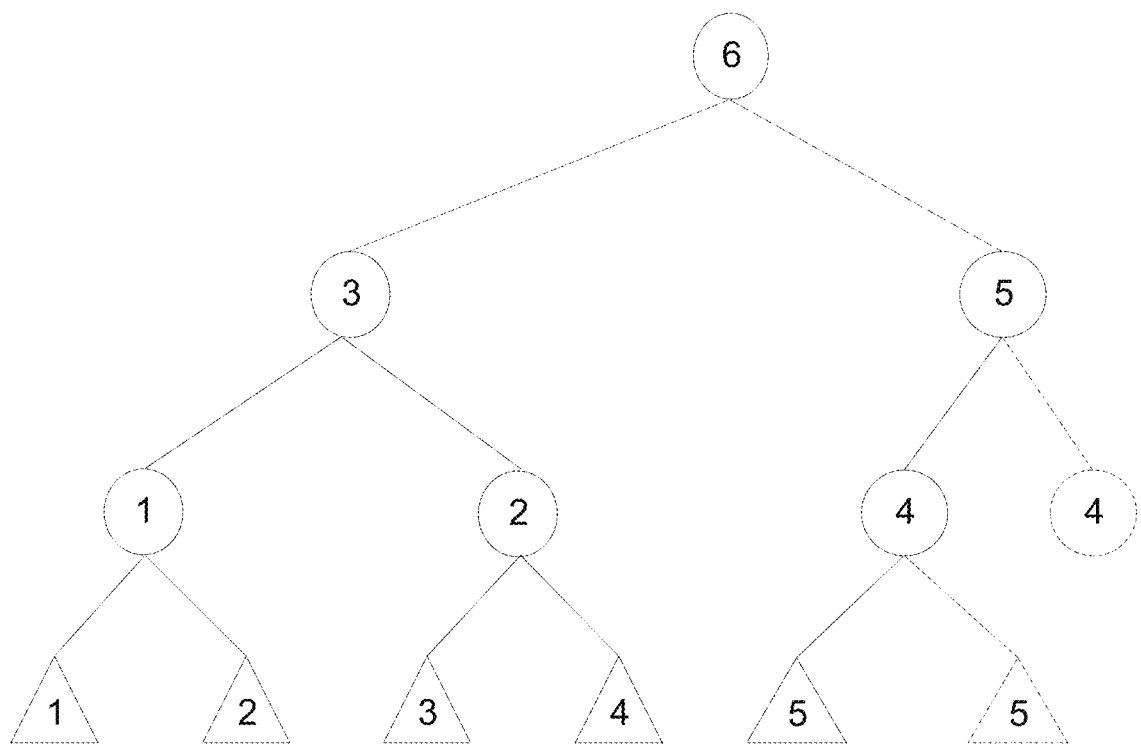
FIG. 1 is a structural diagram of a traditional Merkle tree provided by the present disclosure.

A traditional Merkle tree includes a set of leaf nodes, a set of intermediate nodes and a root node. FIG. 1 is a structural diagram of a traditional Merkle tree. As shown in FIG. 1, the Merkle tree includes four leaf nodes, two intermediate nodes and one root node, and it is assumed that the leaf nodes are assigned a set of numbers, and the intermediate nodes and the root node are assigned another set of numbers.

On the basis of the embodiment shown in FIG. 1, when there is new service data, a new leaf node 5 will be created for the new service data, and it is necessary to insert the leaf node 5 into the Merkle tree. When a traditional Merkle tree structure is adopted, hash calculation is performed first based on the new service data to obtain a hash value carried by the leaf node 5, and then a hash string corresponding to the hash value of the leaf node 5 is concatenated with itself to obtain a hash value carried by a parent node (that is, an intermediate node 4) of the leaf node 5 through hash calculation again. Then, a hash string of the hash value carried by the intermediate node 4 is concatenated with itself to obtain a hash value carried by a parent node (that is, an intermediate node 5) of the intermediate node 4 through hash calculation again. After that, a hash string of the hash value of the intermediate node 5 is concatenated with a hash string of a hash value of an intermediate node 3 to obtain a hash value carried by a root node 6 through hash calculation again, thus completing the insertion of the leaf node 5. When there are additional new service data, the next step is to create a new leaf node 6 and insert it into the Merkle tree. When inserting the leaf node 6, the hash values carried by the above-mentioned intermediate node 4, intermediate node 5 and root node 6 need to be recalculated and updated, which leads to the invalidity of values of the intermediate node 4, intermediate node 5 and root node 6 calculated when inserting the leaf node 5. That is, this part of the intermediate node calculation is a redundant calculation, causing wastage of computational resources. Moreover, the computational complexity of inserting a node is high, especially when there are a large number of leaf nodes and multiple levels of intermediate nodes, redundant calculation burden is even greater, severely impacting data processing efficiency. Additionally, using the traditional Merkle tree structure leads to higher complexity in maintaining the Merkle tree (insertion and deletion).

Based on this, the present disclosure provides a data processing method and apparatus based on a Merkle tree. By optimizing the structure of the Merkle tree, invalid intermediate node calculation can be avoided, the complexity of maintaining the Merkle tree can be greatly reduced, and the processing efficiency of a data processing system can be improved.

The data processing method based on a Merkle tree provided by the present disclosure can be realized by the data processing apparatus based on a Merkle tree provided by the present disclosure, and the apparatus can be realized by any software and/or hardware. For example, it can be: a tablet computer, a mobile phone (such as a foldable phone, a large-screen mobile phone, etc.), a wearable device, a notebook computer, an ultra-mobile personal computer (UMPC), a netbook, a personal digital assistant (PDA), a server, a cloud server, a service cluster, etc.

Next, the data processing method based on a Merkle tree provided by the present disclosure will be introduced in detail through several specific embodiments in combination with the attached drawings.

Figure 2:
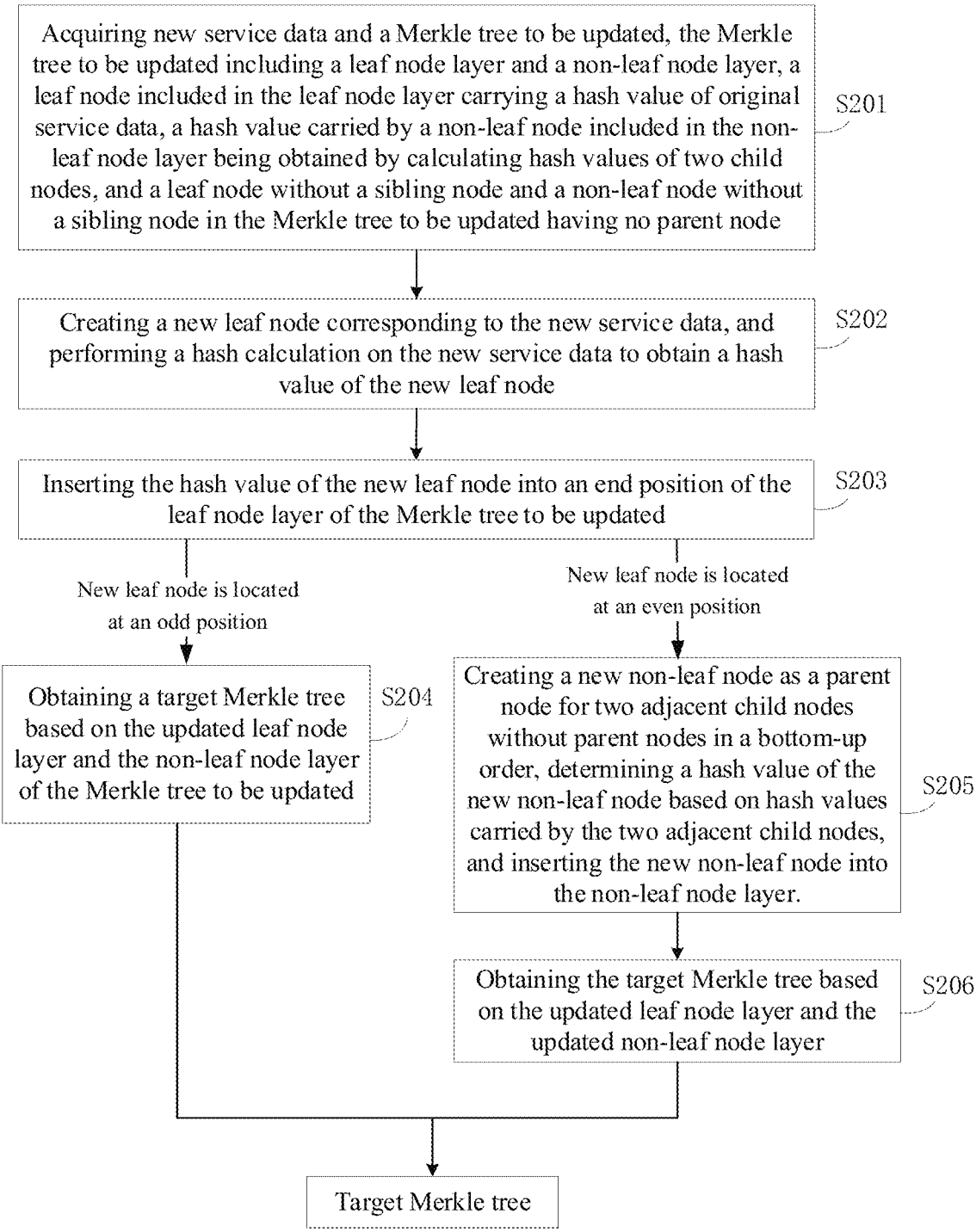
FIG. 2 is a flowchart of a data processing method based on a Merkle tree provided by an embodiment of the present disclosure.

FIG. 2 is a flowchart of a data processing method based on a Merkle tree provided by an embodiment of the present disclosure. Referring to FIG. 2, the method in the present embodiment includes the following steps.

S201, acquiring new service data and a Merkle tree to be updated, the Merkle tree to be updated including a leaf node layer and a non-leaf node layer, a leaf node included in the leaf node layer carrying a hash value of original service data, a hash value carried by a non-leaf node included in the non-leaf node layer being obtained by calculating hash values of two child nodes, and a leaf node without a sibling node and a non-leaf node without a sibling node in the Merkle tree to be updated having no parent node.

The new service data can be any type of service data, which can be file data, music data, image data downloaded from the network, or other resource data, which is not limited by the present disclosure.

Figure 3A:
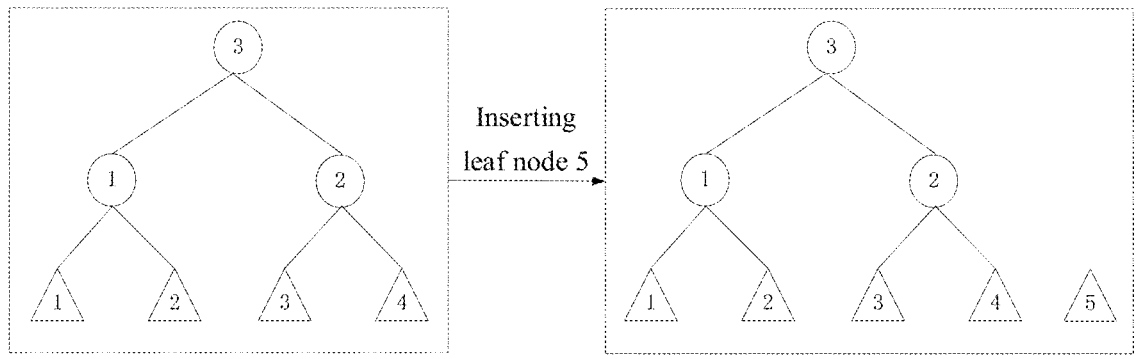
FIGS. 3A, 3B, 3C, 3D, 3E and 3F are diagrams of structural changes of a Merkle tree when updated using a method provided by the present disclosure.

The Merkle tree to be updated is established in a bottom-up order based on original service data included in an original service data set. Leaf nodes are created first, then parent nodes are generated based on the leaf nodes, and then the Merkle tree to be updated is obtained step by step. Here, the order of the leaf nodes in a leaf node layer depends on the creation order, and the creation order is consistent with the generation order of the original service data. There are two types of nodes in the structure of the Merkle tree adopted in the present disclosure: leaf nodes and non-leaf nodes. The leaf nodes are nodes carrying hash values of the original service data, which are located at the lowest layer of the Merkle tree, and the non-leaf nodes are nodes located above the leaf node layer, which can be intermediate nodes or root nodes. In the process of creating the Merkle tree to be updated, no parent node is generated for leaf nodes and non-leaf node without sibling nodes, and the parent node will be generated only if two child nodes exist at the same time. Assuming that five leaf nodes are generated based on the original service data set, the structure of the Merkle tree to be updated created according to the disclosed method is as shown in FIG. 3A, including five leaf nodes and three non-leaf nodes, triangles represent leaf nodes and circles represent non-leaf nodes. It can be seen by comparing the structure of the Merkle tree shown in FIG. 3A with the structure in FIG. 1 that, the parts formed by leaf nodes 1 to 4 and non-leaf nodes 1 to 3 are the same. For the leaf node 5, because it is located at an odd position in the leaf node layer and there is no sibling node, during creation, it is not necessary to concatenate a hash string of a hash value carried by the leaf node 5 with itself to obtain a hash value carried by the non-leaf node 4 through hash calculation, so it is not necessary to generate the non-leaf nodes 5 and 6.

S202, creating a new leaf node corresponding to the new service data, and performing a hash calculation on the new service data to obtain a hash value of the new leaf node.

A pre-specified hash algorithm is adopted to hash the new service data and convert it into a hash value. There are no limitations imposed on the hash algorithm in the present disclosure, and the calculated hash value is the hash value carried by the new leaf node.

S203, inserting the hash value of the new leaf node into an end position of the leaf node layer of the Merkle tree to be updated.

The new leaf node is inserted into the leaf node layer of the Merkle tree to be updated. All the leaf nodes in the leaf node layer are arranged in the order of generation, so the new leaf node is inserted into the end position of the leaf node layer, and after insertion, the new leaf node is the last leaf node of the updated leaf node layer.

After inserting the new leaf node, whether a non-leaf node layer of the Merkle tree to be updated needs to be updated can be determined according to whether the new leaf node is located at an odd position or an even position in the leaf node layer. If the new leaf node is located at an odd position, it can be determined that the new leaf node has no sibling node, so it is unnecessary to generate a parent node (the parent node is a non-leaf node), that is, it is unnecessary to update the non-leaf node layer; in this case, S204 is executed. If the new leaf node is located at an even position, it can be determined that the new leaf node has a left sibling node, it is necessary to create a new non-leaf node to record the data change of the leaf node layer caused by the insertion of the new leaf node, and the change needs to be transmitted to the upper layer of the Merkle tree to be updated; in this case, S205 and S206 are executed.

S204, obtaining a target Merkle tree based on the updated leaf node layer and the non-leaf node layer of the Merkle tree to be updated.

The target Merkle tree can be obtained by integrating the updated leaf node layer with the unchanged non-leaf node layer, and the insertion of the new leaf node at an odd position can be completed.

S205, creating a new non-leaf node as a parent node for two adjacent child nodes without parent nodes in a bottom-up order, determining a hash value of the new non-leaf node based on hash values carried by the two adjacent child nodes, and inserting the new non-leaf node into the non-leaf node layer.

A new non-leaf node is created as a parent node for two adjacent child nodes without parent nodes first, and then hash strings of the hash values carried by the two adjacent child nodes are concatenated to obtain the hash value carried by the new non-leaf node through hash calculation. The two adjacent child nodes mentioned here are sibling nodes and are located at adjacent positions of the same layer of the Merkle tree.

The Merkle tree is updated layer by layer in a bottom-up order to create a new non-leaf node and insert it into the non-leaf node layer. The number of new non-leaf nodes can be one or more, and it is related to the position of the new leaf node in the leaf node layer. It is understood that at least one new non-leaf node needs to be created to carry the information of the new leaf node and its sibling node. Therefore, two adjacent child nodes of a first new non-leaf node include the new leaf node and the sibling node of the new leaf node (i.e., the sibling node of the new leaf node is a target associated node corresponding to the first new non-leaf node). If the first new non-leaf node has a sibling node, a second new non-leaf node needs to be created. Two adjacent child nodes of the second new non-leaf node include the first new non-leaf node and the sibling node of the first new non-leaf node (i.e., the sibling node of the first new non-leaf node is a target associated node corresponding to the second new non-leaf node), and so on, in a bottom-up order. By analyzing the above process, it can be seen that the target associated nodes such as the sibling node of the new leaf node, the sibling node of the first new non-leaf node, and the sibling node of the second new non-leaf node are all pre-existing nodes in the Merkle tree to be updated, which are nodes on a verification path corresponding to the new leaf node. Therefore, it is possible to determine which nodes are included in the verification path of the new leaf node first, and then determine the target associated nodes corresponding to each new non-leaf node from these nodes.

As a possible implementation, which nodes are included in the verification path of the new leaf node is determined first, the nodes on the verification path are candidate associated nodes, and a candidate associated node set is formed by the nodes on the verification path and the sibling node of the new leaf node; and then, how many times the hash calculation is required due to the insertion of the new leaf node is determined (equivalent to determining the number of associated nodes), and then the target associated node required for each time of hash calculation are determined in sequence from the candidate associated node set, that is, the target associated node corresponding to each new non-leaf node.

Determining the candidate associated node set can be realized by the following ways.

Because the new leaf node is located at an even position, it is first determined that a node to be verified is the sibling node of the new leaf node, and the candidate associated node set includes the sibling node of the new leaf node and non-leaf nodes required for verifying the sibling node.

To determine the candidate associated node set, a position index of the sibling node of the new leaf node in the leaf node layer is acquired and converted into a first bit sequence; and then the first bit sequence is analyzed by traversing it in the order from the highest bit to the lowest bit, so as to determine a first target bit satisfying a predetermined condition, and a node indicated by the first target bit is a candidate associated node included in the candidate associated node set.

In some embodiments, the position index of each leaf nodes in the leaf node layer and the position index of each non-leaf node in the non-leaf node layer are numbered starting from 1. In the first bit sequence, the position indexes of each bit start from 0 and increase in the direction from the lowest bit to the highest bit. The first predetermined condition is that the value of the bit is 1.

After the traversal of the first bit sequence is started, for a first first target bit that has a value of 1, its position index in the first bit sequence is denoted as M1. If M1 is not equal to 0, then the position index of a non-leaf node indicated by the first first target bit in the non-leaf node layer is calculated through the power operation $2^{M1}-1$. Continuing the traversal to the right, for a second first target bit that has a value of 1, its position index in the first bit sequence is denoted as M2. A position index difference is calculated through the power operation $2^{M2}-1$, and added to the position index of the non-leaf node indicated by the previous first target bit, so as to obtain the position index of a non-leaf node indicated by the second first target bit in the non-leaf node layer. By traversing sequentially to the right according to this method, the non-leaf nodes indicated by each first target bit can be determined, and all these non-leaf nodes are the candidate associated nodes.

It should be noted that, assuming the length of the first bit sequence is N, because the sibling node of the new leaf node is located at an odd position, the value of the lowest bit in the first bit sequence is 1, and the candidate associated node indicated by the lowest bit is the sibling node of the new leaf node itself, therefore, the non-leaf nodes included in the verification path can be determined by traversing the first N−1 bits in the order from the highest bit to the lowest bit during traversal.

For example, on the basis of the embodiment shown in FIG. 3A, assuming that both the leaf nodes and the intermediate nodes are numbered starting from 1 in an increasing order, if a new leaf node 6 (the sixth leaf node) is inserted, it is necessary to verify the leaf node 5, convert the position index 5 into a binary sequence of 101, and traverse it in the order from the highest bit to the lowest bit; and if the position index of the first first target bit with the value of 1 is 2, calculating $2^2-1$ gives 3, determining that a non-leaf node indicated by the first first target bit with a value of 1 is the non-leaf node 3. Continuing the traversal to the right, the positional index of the second first target bit that has a value of 1 is 0, indicating the leaf node 5 itself. In conclusion, the candidate associated node set includes the non-leaf node 3 and the leaf node 5, and according to the traversal order, the non-leaf node 3 is determined first, followed by the leaf node 5.

Next, target associated nodes corresponding to each new non-leaf node are determined from the candidate associated node set.

In some embodiments, the position index of the new leaf node in the leaf node layer can be obtained, the position index of the new leaf node can be converted into a second bit sequence, and a second target bit can be determined by traversing the second bit sequence. Based on a distance between the second target bit and the lowest bit, how many times the hash calculation is required is determined, and then a corresponding number of candidate associated nodes are determined to be the target associated nodes from the candidate associated node set. The second target bit is a bit in the second bit sequence that has a value of 1 and is closest to the lowest bit, and the distance between the second target bit and the lowest bit can be determined by subtracting the position index of the lowest bit from the position index of the second target bit. The candidate associated nodes are retrieved in an order from latest to earliest in determining the candidate associated nodes. The first retrieved candidate associated node is the target associated node corresponding to the first new non-leaf node, the second retrieved candidate associated node is the target associated node corresponding to the second new non-leaf node, the third retrieved candidate associated node is the target associated node corresponding to the third new non-leaf node, and so on.

For example, on the basis of the embodiment shown in FIG. 3A, taking the insertion of a new leaf node 6, and the set of candidate association node including the non-leaf node 3 and the leaf node 5 as an example for illustration. The position index of the new leaf node is 6, and the position index is converted into a second bit sequence of 110. The second bit sequence is traversed in the order from the lowest bit to the highest bit, the second target bit is determined to be a third bit from right to left, and the distance between the second target bit and the lowest bit is 1. Therefore, hash calculation needs to be performed once to generate a new non-leaf node, and one candidate associated node in the candidate associated node set needs to be used for the hash calculation. Then, in the order from latest to earliest in determining the candidate associated nodes, the last candidate associated node is determined as the first target associated node, that is, the first target associated node is the leaf node 5.

The number of new non-leaf nodes can be one or more, which is related to the distance between the second target bit and the lowest bit calculated above.

If there is one new non-leaf node, a new intermediate node is created, then a hash string of a hash value carried by the new leaf node is concatenated with a hash string of a hash value carried by its sibling node to obtain a hash value of the new non-leaf node through hash calculation, and then the new non-leaf node is inserted into the non-leaf node layer.

If there are a plurality of new non-leaf nodes, updating is performed in a bottom-up order. A first new non-leaf node is generated first, the hash string of the hash value carried by the new leaf node is concatenated with the hash string of the hash value carried by its sibling node (target associated node) to obtain the hash value of the new non-leaf node through hash calculation, and then the new non-leaf node is inserted into the non-leaf node layer; next, a second new non-leaf node is generated, the hash string of the hash value carried by the corresponding target associated node is concatenated with the hash string of the hash value carried by the first new non-leaf node to obtain the hash value carried by the second new non-leaf node through hash calculation, and then the new non-leaf node is inserted into the non-leaf node layer, and so on. In this way, the hash values of all new non-leaf nodes can be calculated, so as to obtain the updated non-leaf node layer.

S206, obtaining the target Merkle tree based on the updated leaf node layer and the updated non-leaf node layer.

By integrating the updated leaf node layer and the updated intermediate node layer, the target Merkle tree can be obtained, completing the insertion of the new leaf node and the new non-leaf node, and successfully transmitting the bottom layer leaf node data changes to the upper layer.

Figure 3B:
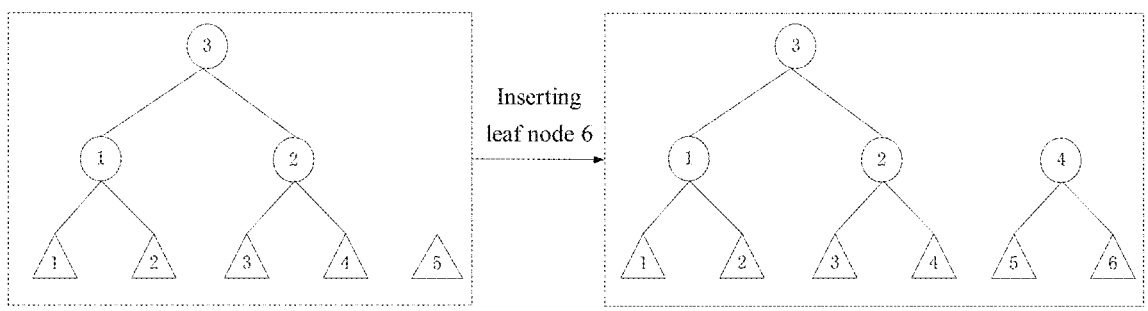

On the basis of the embodiment shown in FIG. 3A, the structural diagram of the target Merkle tree obtained after inserting the new leaf node 6 and the new non-leaf node 4 is shown in FIG. 3B. By comparison, it can be seen that by adopting the method of the present disclosure, the number of times of non-leaf node calculation required for inserting the new leaf node 6 at an even position is 1; by adopting the traditional Merkle tree structure, the number of times of non-leaf node calculation required for inserting the new leaf nodes 6 is three; therefore, the computational burden on the non-leaf nodes is significantly reduced.

In addition, if a new leaf node is inserted at an odd position, it is not necessary to update the intermediate node layer by using the method of the present disclosure, that is, the number of times of non-leaf node calculation is equivalent to zero, while the traditional method requires multiple times of intermediate node calculation. For example, when inserting a new leaf node 5, by adopting the method of the present disclosure, generation of a new intermediate node is not necessary; by using the traditional Merkle tree structure, three times of intermediate node calculation are required to generate intermediate nodes 4, 5 and 6 respectively. By comparison, it can be seen that the calculation burden is obviously reduced by adopting the method of the present disclosure.

In the present embodiment, by optimizing the structure of the Merkle tree, the number of intermediate nodes to be updated is greatly reduced when inserting a new leaf node into the Merkle tree, thus solving the problem of redundant calculation of a large number of intermediate nodes when adopting the traditional tree structure, reducing the computational complexity of inserting a new leaf node, and thus greatly improving the data processing efficiency.

On the basis of the embodiment shown in FIG. 2, the Merkle tree to be updated can be stored using a one-dimensional array structure, and the one-dimensional array data structure is simple and easy to maintain. The leaf node layer corresponds to a first array, the non-leaf node layer corresponds to a second array, the hash value of each leaf node included in the leaf node layer are stored in the first array in the order of generation, and the hash value of each non-leaf node included in the non-leaf node layer are stored in the second array in the order of generation.

By inserting a new leaf node into the leaf node layer, that is, inserting a hash value of the new leaf node into an end of the first array, an updated first array is obtained. By inserting a new intermediate node into the intermediate node layer, that is, inserting a hash value of the new intermediate node into an end of the second array, an updated second array is obtained. Then the target Merkle tree corresponds to the updated first array and the updated second array. Because the Merkle tree is a verifiable data structure, the target Merkle tree stored using an array structure and obtained after updating can be understood as a target verifiable array.

It should be understood that there may be multiple new service data at the same time, and the handling process for each new service data is similar, as described in the embodiment shown in FIG. 2, and will not be repeated here.

Some examples are given to illustrate how to update the Merkle tree by using the method provided by the present disclosure. In the following examples, leaf nodes and non-leaf nodes are numbered separately, starting from 1 in an increasing order.

Figure 3C:
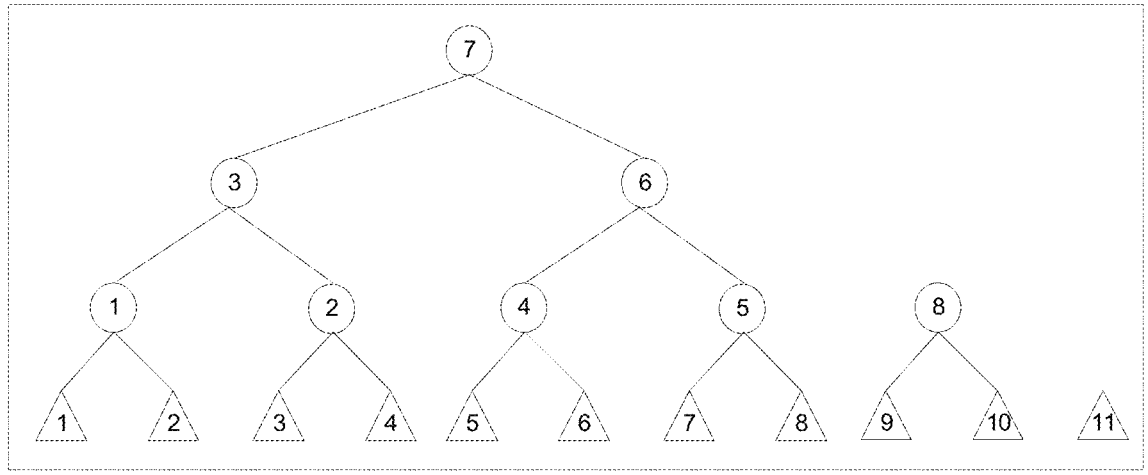

Example 1: As shown in FIG. 3C, the Merkle tree to be updated includes 11 leaf nodes and 8 non-leaf nodes. Because a new leaf node 12 is at an even position, it is necessary to determine a target associated node based on its sibling node, namely leaf node 11. A position index 11 of the leaf node 11 is converted into a binary sequence 1011. Because the leaf node 11 is a node at an odd position, it means that the leaf node 11 occupies a single node. After conversion to binary, traversal is performed from left to right. Besides the lowest bit, two bits with a value of 1 exist, which correspond to two full binary trees, namely, binary trees to which a leaf node 8 and a leaf node 10 belong. The lowest bit has a value of 1, indicating the leaf node 11. Therefore, a candidate association node set includes a root node (non-leaf node 7) of the leaf node 8, a root node (non-leaf node 8) of the leaf node 10 and the leaf node 11.

Traversal is performed according to the encoding method of the embodiment described in FIG. 2. For a first bit with a value of 1 from left to right, based on $2^3-1=7$, it is determined that a candidate associated node indicated by the first bit with a value of 1 is a non-leaf node 7, that is, the root node of the leaf node 8 is the non-leaf node 7. For a second bit with a value of 1 from left to right, based on $2^1-1=1$, a position index difference 1 and a position index 7 are added to determine that a candidate associated node indicated by the second bit with a value of 1 is the non-leaf node 8, that is, the root node of the leaf node 10 is the non-leaf node 8.

The candidate association node set includes the non-leaf node 7, the non-leaf node 8 and the leaf node 11. In the practical application scenario, an electronic device can write hash values of the candidate associated nodes included in the candidate associated node set into a data stack according to a determined order, and when calculating the hash value of a new non-leaf node, hash values of target associated nodes that are needed are read from the data stack in the Last-In-First-Out (LIFO) order.

Next, a position index 12 of a new leaf node 12 is converted into a binary sequence 1100, which is traversed from right to left, a first bit with a value of 1 is determined to be a third bit, and the distance between the third bit and the lowest bit is 2, indicating that hash calculation needs to be performed twice to generate two new non-leaf nodes.

A first new non-leaf node is generated first. According to the generation order of non-leaf nodes, it is known that the first new non-leaf node is non-leaf node 9. The hash value of the last candidate associated node, namely the leaf node 11, is read from the data stack, the hash value of the leaf node 11 is concatenated with the hash value of the new leaf node 12 to obtain the hash value of the non-leaf node 9 through hash calculation, and then the non-leaf node 9 is inserted into the non-leaf node layer. Next, a second new non-leaf node is generated. According to the generation order of non-leaf nodes, it is known that the second new non-leaf node is non-leaf node 10. The hash value of the penultimate candidate associated node, namely the non-leaf node 8, is read from the data stack, the hash value of the non-leaf node 8 is concatenated with the hash value of the non-leaf node 9 to obtain the hash value of the non-leaf node 10 through hash calculation, and then the non-leaf node 10 is inserted into the non-leaf node layer.

Figure 3D:
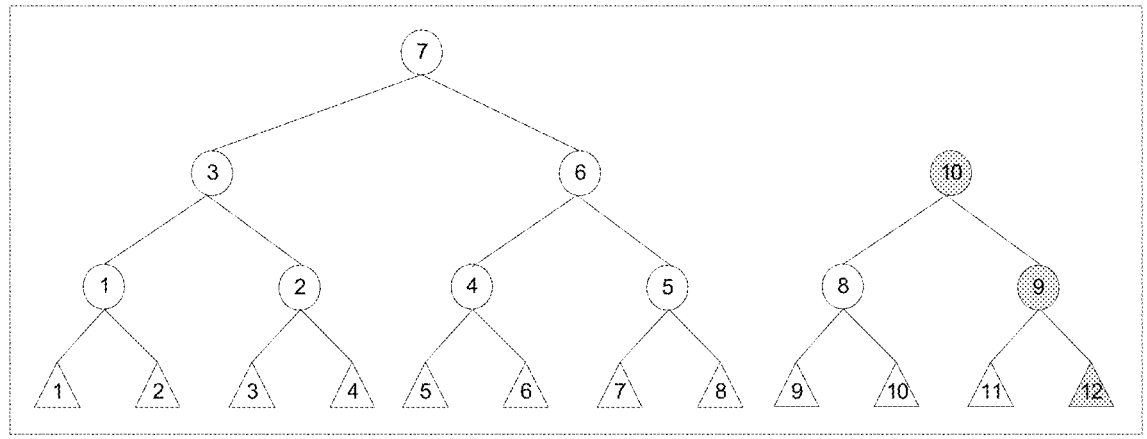

The structure of the target Merkle tree obtained after inserting the new leaf node 12, the new non-leaf node 9 and the new non-leaf node 10 is shown in FIG. 3D.

If the traditional Merkle tree structure is adopted, after the non-leaf node 10 is generated, the hash value of the non-leaf node 10 needs to be concatenated with itself to obtain a hash value of a parent node of the non-leaf node 10 through hash calculation, and the parent node of the non-leaf node 10 needs to be hashed again with the non-leaf node 7 to obtain a hash value of a root node of the Merkle tree. By comparison, it can be seen that this part of redundant non-leaf node calculation is omitted by adopting the method of the present disclosure, so that the complexity of maintaining the Merkle tree is reduced and the data processing efficiency is improved.

Figure 3E:
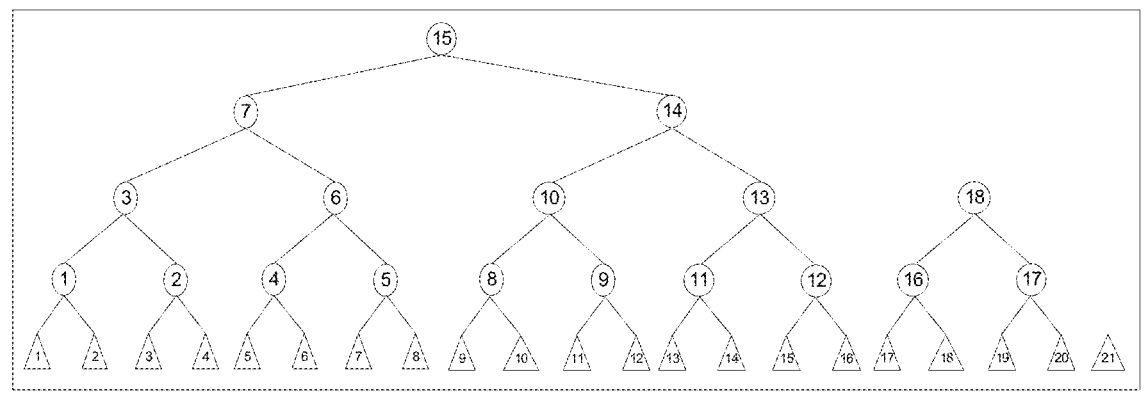

Example 2: As shown in FIG. 3E, the Merkle tree to be updated includes 21 leaf nodes and 18 non-leaf nodes. Because a new leaf node 22 is at an even position, it is necessary to determine a target associated node based on its sibling node, namely leaf node 21. A position index 21 of the leaf node 21 is converted into a binary sequence 10101. After the position index 21 of the leaf node 21 is converted into binary, traversal is performed from left to right. Besides the lowest bit, two bits with a value of 1 exist. For a first bit with a value of 1 from left to right, based on $2^4-1=15$, it is determined that a candidate associated node indicated by the first bit with a value of 1 is a non-leaf node 15. For a second bit with a value of 1 from left to right, based on $2^2-1=3$, a position index difference 3 and a position index 15 are added to determine that a candidate associated node indicated by the second bit with a value of 1 is the non-leaf node 18.

The candidate association node set includes the non-leaf node 15, the non-leaf node 18 and the leaf node 21. Hash values of the candidate associated nodes included in the candidate associated node set can be written into a data stack according to a determined order, and when calculating the hash value of a new non-leaf node, hash values of target associated nodes are read from the data stack.

Next, a position index 22 of a new leaf node 22 is converted into a binary sequence 10110, which is traversed from right to left, a first bit with a value of 1 is determined to be a second bit, and the distance between the second bit and the lowest bit is 1, indicating that hash calculation needs to be performed once to generate a new non-leaf node.

A new non-leaf node is generated first. According to the generation order of non-leaf nodes, it is known that the first new non-leaf node is non-leaf node 19. The hash value of the last candidate associated node, namely the leaf node 21, is read from the data stack, the hash value of the leaf node 21 is concatenated with the hash value of the new leaf node 22 to obtain the hash value of the non-leaf node 9 through hash calculation, and then the non-leaf node 19 is inserted into the non-leaf node layer.

Figure 3F:
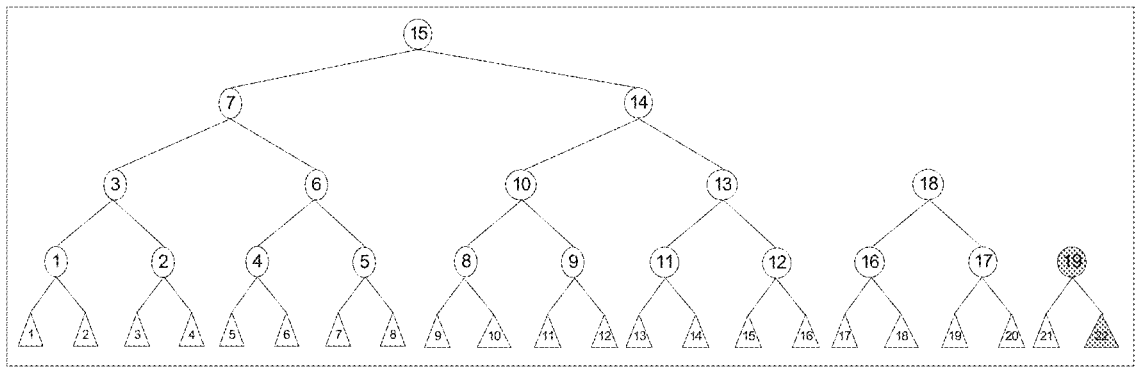

The structure of the target Merkle tree obtained after inserting the new leaf node 22 and the new non-leaf node 19 is shown in FIG. 3F.

If the traditional Merkle tree structure is adopted, after the non-leaf node 19 is generated, hash calculation needs to be performed another five times layer by layer. By comparison, it can be seen that this part of redundant non-leaf node calculation is omitted by adopting the method of the present disclosure, so that the complexity of maintaining the Merkle tree is reduced and the data processing efficiency is improved.

In combination with the above examples, it can be observed that, in cases where there are a large number of leaf and non-leaf nodes, adopting the Merkle tree structure provided in the present disclosure can reduce the computational load of non-leaf nodes when adding a new leaf node, leading to a more pronounced improvement in data processing efficiency.

Figure 4:
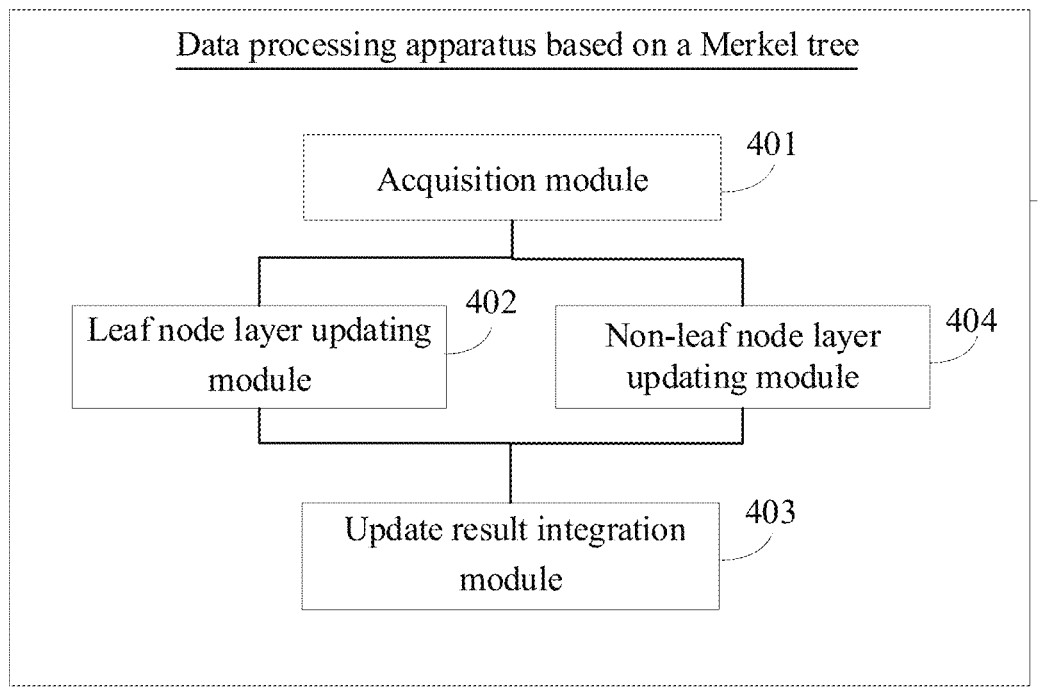
FIG. 4 is a structural diagram of a data processing apparatus based on a Merkle tree provided by an embodiment of the present disclosure.

FIG. 4 is a structural diagram of a data processing apparatus based on a Merkle tree provided by an embodiment of the present disclosure. As shown in FIG. 4, the data processing apparatus 400 based on a Merkle tree provided by the present embodiment includes:

an acquisition module 401, configured to acquire new service data and a Merkle tree to be updated, the Merkle tree to be updated including a leaf node layer and a non-leaf node layer, a leaf node included in the leaf node layer carrying a hash value of original service data, a hash value carried by a non-leaf node included in the non-leaf node layer being obtained by calculating hash values of two child nodes, and in the Merkle tree to be updated, there is no such a node that its adjacent node has no parent node;

a leaf node layer updating module 402, configured to create a new leaf node corresponding to the new service data, calculate a hash value of the new service data as a hash value of the new leaf node, and insert the hash value of the new leaf node into an end position of the leaf node layer;

an update result integration module 403, configured to, if the new leaf node is located at an odd position in the leaf node layer, obtain a target Merkle tree based on an updated leaf node layer and the non-leaf node layer of the Merkle tree to be updated; and a non-leaf node layer updating module 404, configured to, if the new leaf node is located at an even position in the leaf node layer, create a new non-leaf node as a parent node for two adjacent child nodes without parent nodes in a bottom-up order, determine a hash value of the new non-leaf node based on hash values carried by the two adjacent child nodes, and insert the new non-leaf node into the non-leaf node layer;

the update result integration module 403 is further configured to, if the new leaf node is located at an even position in the leaf node layer, obtain the target Merkle tree based on the updated leaf node layer and the updated non-leaf node layer.

In the target Merkle tree, there is no such a node that its adjacent node has no parent node.

In some embodiments, if the new non-leaf node is a parent node of the new leaf node, two adjacent child nodes of the new non-leaf node include the new leaf node and a corresponding target associated node; if the new non-leaf node is a parent node of two non-leaf nodes, the two adjacent child nodes of the new non-leaf node include a corresponding target associated node and a previously created new non-leaf node; and the target associated node is a node on a verification path corresponding to the new leaf node.

In some embodiments, the non-leaf node layer updating module 404 is further configured to acquire a position index of a sibling node of the new leaf node in the leaf node layer and convert a corresponding position index of the sibling node into a first bit sequence; traverse the first bit sequence in the order from the highest bit to the lowest bit, and if a first target bit satisfying a first predetermined condition is traversed during the traversal, determine a candidate associated node set based on a non-leaf node or a leaf node indicated by the first target bit that is traversed; and determine the target associated node related to the new non-leaf node from the candidate associated node set based on a position of the new leaf node in the leaf node layer.

In some embodiments, the non-leaf node layer updating module 404 is specifically configured to, if the first target bit is not the lowest bit, perform a power operation on a position index of the first target bit in the first bit sequence to obtain a position index difference, add the position index difference to a position index of a non-leaf node indicated by a previous first target bit to obtain a target position index, and determine that a non-leaf node corresponding to the target position index is a candidate associated node included in the candidate intermediate node set; and if the first target bit is the lowest bit, determine that a sibling node of the new leaf node is the candidate associated node.

In some embodiments, the position index of each bit in the first bit sequence is numbered starting from 0 in the direction from the lowest bit to the highest bit, and the first predetermined condition is that a value of the bit is 1.

In some embodiments, the non-leaf node layer updating module 404 is specifically configured to acquire a position index of the new leaf node in the leaf node layer, and convert a corresponding position index of the new leaf node into a second bit sequence; traverse the second bit sequence in the order from the lowest bit to the highest bit to determine a second target bit; and determine a number of the target associated nodes based on a distance between the second target bit and the lowest bit, and determine a corresponding number of candidate associated nodes from the candidate associated node set in an order from latest to earliest in determining the candidate associated nodes as the target associated nodes.

In some embodiments, the position index of each bit in the second bit sequence is numbered starting from 0 in the direction from the lowest bit to the highest bit, and the second target bit is a bit with a value of 1 in the second bit sequence and closest to the lowest bit.

In some embodiments, the Merkle tree to be updated is stored using a one-dimensional array structure, hash values of each leaf node included in the leaf node layer are stored in a first array in an order of generation, and hash values of each non-leaf node included in the non-leaf node layer are stored in a second array in the order of generation.

The leaf node layer updating module 402 is specifically configured to insert the hash value of the new leaf node into an end of the first array corresponding to the leaf node layer.

The non-leaf node layer updating module 404 is specifically configured to insert the hash value of the new non-leaf node into an end of the second array corresponding to the non-leaf node layer.

The data processing apparatus based on a Merkle tree provided by the present embodiment can be used to implement the technical solution of any of the above-mentioned method embodiments. Its implementation principle and technical effectiveness are similar to those of the method. To avoid redundancy, please refer to the respective method embodiments for further information.

Figure 5:
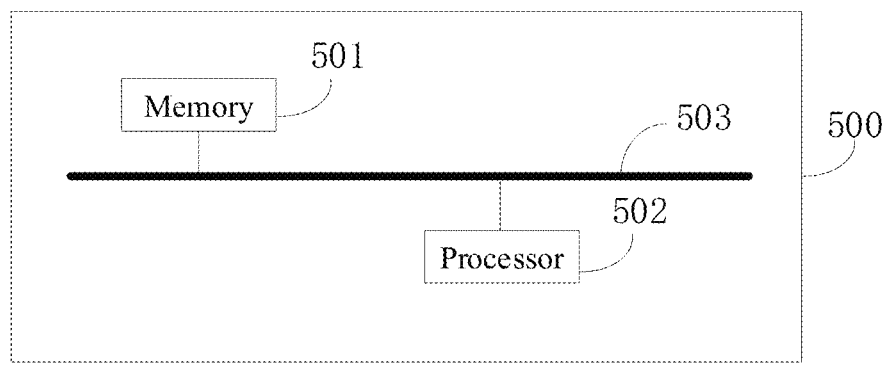
FIG. 5 is a structural diagram of an electronic device provided by an embodiment of the present disclosure.

FIG. 5 is a structural diagram of an electronic device provided by an embodiment of the present disclosure. As shown in FIG. 5, an electronic device 500 provided by the present embodiment includes a memory 501 and a processor 502.

The memory 501 can be an independent physical unit and can be connected with the processor 502 through a bus 503. The memory 501 and the processor 502 may also be integrated and realized by hardware.

The memory 501 is used for storing program instructions, and the processor 502 invokes the program instructions to implement any of the above method embodiments.

Alternatively, when part or all of the methods in the above embodiments are implemented by software, the above electronic device 500 may only include the processor 502. The memory 501 for storing programs is located outside the electronic device 500, and the processor 502 is connected with the memory through circuits/wires for reading and executing the programs stored in the memory.

The processor 502 may be a central processing unit (CPU), a network processor (NP) or a combination of CPU and NP.

The processor 502 may further include a hardware chip. The hardware chip can be an application-specific integrated circuit (ASIC), a programmable logic device (PLD) or a combination thereof. The PLD may be a complex programmable logic device (CPLD), a field-programmable gate array (FPGA), a generic array logic (GAL) or any combination thereof.

The memory 501 may include a volatile memory such as a random-access memory (RAM); the memory may also include a non-volatile memory, such as a flash memory, a hard disk drive (HDD) or a solid-state drive (SSD); and the memory may also include a combination of the above memories.

An embodiment of the present disclosure also provides a readable storage medium which includes computer program instructions. When the computer program instructions are executed by at least one processor of an electronic device, the data processing method based on a Merkle tree according to any of the above method embodiments is realized.

An embodiment of the present disclosure also provides a computer program product, which includes computer program instructions stored in a readable storage medium, at least one processor of an electronic device can read the computer program instructions from the readable storage medium, and the at least one processor executes the computer program instructions to enable the electronic device to realize the data processing method based on a Merkle tree according to any of the above method embodiments.

It should be noted that relational terms herein such as "first" and "second" are only used to distinguish one entity or operation from another entity or operation without necessarily requiring or implying any actual such relationship or order between such entities or operations. In addition, terms "include", "comprise", or any other variations thereof are intended to cover non-exclusive including, so that a process, a method, an article, or a device including a series of elements not only includes those elements, but also includes other elements that are not explicitly listed, or also includes inherent elements of the process, the method, the article, or the device. Without more restrictions, the elements defined by the sentence "including a . . . " do not exclude the existence of other identical elements in the process, method, article, or device including the elements.

The foregoing are descriptions of specific implementations of the present disclosure, allowing a person skilled in the art to understand or implement the embodiments of the present disclosure. A plurality of amendments to these embodiments are apparent to those skilled in the art, and general principles defined herein can be achieved in other embodiments without departing from the spirit or scope of the embodiments of the present disclosure. Thus, the embodiments of the present disclosure will not be limited to these embodiments described herein, but shall accord with the widest scope consistent with the principles and novel characteristics disclosed herein.

What is claimed is:

1. A data processing method based on a Merkle tree, comprising:
   acquiring new service data and a Merkle tree to be updated, the Merkle tree to be updated comprising a leaf node layer and a non-leaf node layer, a leaf node comprised in the leaf node layer carrying a hash value of original service data, a hash value carried by a non-leaf node comprised in the non-leaf node layer being obtained by calculating hash values of two child nodes, in the Merkle tree to be updated, there is no such a node that its adjacent node has no parent node;
   creating a new leaf node corresponding to the new service data, calculating a hash value of the new service data as a hash value of the new leaf node, and inserting the hash value of the new leaf node into an end position of the leaf node layer;
   in case that the new leaf node is located at an odd position in the leaf node layer, obtaining a target Merkle tree based on an updated leaf node layer and the non-leaf node layer of the Merkle tree to be updated; and
   in case that the new leaf node is located at an even position in the leaf node layer, creating a new non-leaf node as a parent node for two adjacent child nodes without parent nodes in a bottom-up order, determining a hash value of the new non-leaf node based on hash values carried by the two adjacent child nodes, inserting the new non-leaf node into the non-leaf node layer, and obtaining the target Merkle tree based on the updated leaf node layer and the updated non-leaf node layer, wherein in the target Merkle tree, there is no such a node that its adjacent node has no parent node.

2. The method according to claim 1, wherein
   in case that the new non-leaf node is a parent node of the new leaf node, two adjacent child nodes of the new non-leaf node comprise the new leaf node and a corresponding target associated node;
   in case that the new non-leaf node is a parent node of two non-leaf nodes, the two adjacent child nodes of the new non-leaf node comprise a corresponding target associated node and a previously created new non-leaf node; and
   the target associated node is a node on a verification path corresponding to the new leaf node.

3. The method according to claim 2, further comprising:
   acquiring a position index of a sibling node of the new leaf node in the leaf node layer and converting a corresponding position index of the sibling node into a first bit sequence;
   traversing the first bit sequence in an order from a highest bit to a lowest bit, and in case that a first target bit satisfying a first predetermined condition is traversed, determining a candidate associated node set based on a non-leaf node or a leaf node indicated by the first target bit that is traversed; and determining the target associated node related to the new non-leaf node from the candidate associated node set based on a position of the new leaf node in the leaf node layer.

4. The method according to claim 3, wherein the determining a candidate associated node set based on a non-leaf node or a leaf node indicated by the first target bit that is traversed comprises:

in case that the first target bit is not the lowest bit, performing a power operation on a position index of the first target bit in the first bit sequence to obtain a position index difference, adding the position index difference to a position index of a non-leaf node indicated by a previous first target bit to obtain a target position index, and determining that a non-leaf node corresponding to the target position index is a candidate associated node comprised in the candidate associated node set; and in case that the first target bit is the lowest bit, determining that a sibling node of the new leaf node is the candidate associated node.

5. The method according to claim 3, wherein a position index of each bit in the first bit sequence is numbered starting from 0 in a direction from the lowest bit to the highest bit, and the first predetermined condition is that a value of the bit is 1.

6. The method according to claim 3, wherein the determining the target associated node related to the new non-leaf node from the candidate associated node set based on a position of the new leaf node in the leaf node layer comprises:

acquiring a position index of the new leaf node in the leaf node layer, and converting a corresponding position index of the new leaf node into a second bit sequence;

traversing the second bit sequence in the order from the lowest bit to the highest bit to determine a second target bit; and determining a number of the target associated nodes based on a distance between the second target bit and the lowest bit, and determining a corresponding number of candidate associated nodes from the candidate associated node set in an order from latest to earliest in determining the candidate associated nodes as the target associated nodes.

7. The method according to claim 6, wherein a position index of each bit in the second bit sequence is numbered starting from 0 in a direction from the lowest bit to the highest bit, and the second target bit is a bit with a value of 1 in the second bit sequence and closest to the lowest bit.

8. The method according to claim 1, wherein the Merkle tree to be updated is stored using a one-dimensional array structure, hash values of each leaf node comprised in the leaf node layer are stored in a first array in an order of generation, and hash values of each non-leaf node comprised in the non-leaf node layer are stored in a second array in the order of generation;

the inserting the hash value of the new leaf node into an end position of the leaf node layer comprises: inserting the hash value of the new leaf node into an end of the first array corresponding to the leaf node layer; and the inserting the new non-leaf node into the non-leaf node layer comprises: inserting the hash value of the new non-leaf node into an end of the second array corresponding to the non-leaf node layer.

9. A data processing apparatus based on a Merkle tree, comprising:

an acquisition module, configured to acquire new service data and a Merkle tree to be updated, the Merkle tree to be updated comprising a leaf node layer and a non-leaf node layer, a leaf node comprised in the leaf node layer carrying a hash value of original service data, a hash value carried by a non-leaf node comprised in the non-leaf node layer being obtained by calculating hash values of two child nodes, and in the Merkle tree to be updated, there is no such a node that its adjacent node has no parent node;

a leaf node layer updating module, configured to create a new leaf node corresponding to the new service data, calculate a hash value of the new service data as a hash value of the new leaf node, and insert the hash value of the new leaf node into an end position of the leaf node layer;

an update result integration module, configured to, in case that the new leaf node is located at an odd position in the leaf node layer, obtain a target Merkle tree based on an updated leaf node layer and the non-leaf node layer of the Merkle tree to be updated; and a non-leaf node layer updating module, configured to, in case that the new leaf node is located at an even position in the leaf node layer, create a new non-leaf node as a parent node for two adjacent child nodes without parent nodes in a bottom-up order, determine a hash value of the new non-leaf node based on hash values carried by the two adjacent child nodes, and insert the new non-leaf node into the non-leaf node layer;

wherein the update result integration module is further configured to, in case that the new leaf node is located at an even position in the leaf node layer, obtain the target Merkle tree based on the updated leaf node layer and the updated non-leaf node layer, and in the target Merkle tree, there is no such a node that its adjacent node has no parent node.

10. An electronic device, comprising: a memory and a processor;

the memory is configured to store computer program instructions; and the processor is configured to execute the computer program instructions, causing the electronic device to implement a data processing method based on a Merkle tree, and the method comprises:

acquiring new service data and a Merkle tree to be updated, the Merkle tree to be updated comprising a leaf node layer and a non-leaf node layer, a leaf node comprised in the leaf node layer carrying a hash value of original service data, a hash value carried by a non-leaf node comprised in the non-leaf node layer being obtained by calculating hash values of two child nodes, and in the Merkle tree to be updated, there is no such a node that its adjacent node has no parent node;

creating a new leaf node corresponding to the new service data, calculating a hash value of the new service data as a hash value of the new leaf node, and inserting the hash value of the new leaf node into an end position of the leaf node layer;

in case that the new leaf node is located at an odd position in the leaf node layer, obtaining a target Merkle tree based on an updated leaf node layer and the non-leaf node layer of the Merkle tree to be updated; and in case that the new leaf node is located at an even position in the leaf node layer, creating a new non-leaf node as a parent node for two adjacent child nodes without parent nodes in a bottom-up order, determining a hash value of the new non-leaf node based on hash values carried by the two adjacent child nodes, inserting the new non-leaf node into the non-leaf node layer, and obtaining the target Merkle tree based on the updated leaf node layer and the updated non-leaf node layer, wherein in the target Merkle tree, there is no such a node that its adjacent node has no parent node.

11. The electronic device according to claim 10, wherein
in case that the new non-leaf node is a parent node of the new leaf node, two adjacent child nodes of the new non-leaf node comprise the new leaf node and a corresponding target associated node;
in case that the new non-leaf node is a parent node of two non-leaf nodes, the two adjacent child nodes of the new non-leaf node comprise a corresponding target associated node and a previously created new non-leaf node; and
the target associated node is a node on a verification path corresponding to the new leaf node.

12. The electronic device according to claim 11, wherein the method further comprises:
acquiring a position index of a sibling node of the new leaf node in the leaf node layer and converting a corresponding position index of the sibling node into a first bit sequence;
traversing the first bit sequence in an order from a highest bit to a lowest bit, and in case that a first target bit satisfying a first predetermined condition is traversed, determining a candidate associated node set based on a non-leaf node or a leaf node indicated by the first target bit that is traversed; and
determining the target associated node related to the new non-leaf node from the candidate associated node set based on a position of the new leaf node in the leaf node layer.

13. The electronic device according to claim 12, wherein the determining a candidate associated node set based on a non-leaf node or a leaf node indicated by the first target bit that is traversed comprises:
in case that the first target bit is not the lowest bit, performing a power operation on a position index of the first target bit in the first bit sequence to obtain a position index difference, adding the position index difference to a position index of a non-leaf node indicated by a previous first target bit to obtain a target position index, and determining that a non-leaf node corresponding to the target position index is a candidate associated node comprised in the candidate associated node set; and
in case that the first target bit is the lowest bit, determining that a sibling node of the new leaf node is the candidate associated node.

14. The electronic device according to claim 12, wherein a position index of each bit in the first bit sequence is numbered starting from 0 in a direction from the lowest bit to the highest bit, and the first predetermined condition is that a value of the bit is 1.

15. The electronic device according to claim 12, wherein the determining the target associated node related to the new non-leaf node from the candidate associated node set based on a position of the new leaf node in the leaf node layer comprises:
acquiring a position index of the new leaf node in the leaf node layer, and converting a corresponding position index of the new leaf node into a second bit sequence;
traversing the second bit sequence in the order from the lowest bit to the highest bit to determine a second target bit; and
determining a number of the target associated nodes based on a distance between the second target bit and the lowest bit, and determining a corresponding number of candidate associated nodes from the candidate associated node set in an order from latest to earliest in determining the candidate associated nodes as the target associated nodes.

16. The electronic device according to claim 15, wherein a position index of each bit in the second bit sequence is numbered starting from 0 in a direction from the lowest bit to the highest bit, and the second target bit is a bit with a value of 1 in the second bit sequence and closest to the lowest bit.

17. The electronic device according to claim 10, wherein the Merkle tree to be updated is stored using a one-dimensional array structure, hash values of each leaf node comprised in the leaf node layer are stored in a first array in an order of generation, and hash values of each non-leaf node comprised in the non-leaf node layer are stored in a second array in the order of generation;
the inserting the hash value of the new leaf node into an end position of the leaf node layer comprises: inserting the hash value of the new leaf node into an end of the first array corresponding to the leaf node layer; and
the inserting the new non-leaf node into the non-leaf node layer comprises: inserting the hash value of the new non-leaf node into an end of the second array corresponding to the non-leaf node layer.

18. A readable storage medium, comprising: computer program instructions;
wherein at least one processor of an electronic device executes the computer program instructions, causing the electronic device to implement the data processing method based on the Merkle tree according to claim 1.

19. The readable storage medium according to claim 18, wherein
in case that the new non-leaf node is a parent node of the new leaf node, two adjacent child nodes of the new non-leaf node comprise the new leaf node and a corresponding target associated node;
in case that the new non-leaf node is a parent node of two non-leaf nodes, the two adjacent child nodes of the new non-leaf node comprise a corresponding target associated node and a previously created new non-leaf node; and
the target associated node is a node on a verification path corresponding to the new leaf node.

20. A computer program product, wherein an electronic device executes the computer program product, causing the electronic device to implement the data processing method based on the Merkle tree according to claim 1.

* * * * *